(12) United States Patent
Akerib (10) Patent No.: US 10,949,766 B2
(45) Date of Patent: Mar. 16, 2021

(54) PRECISE EXPONENT AND EXACT SOFTMAX COMPUTATION

(71) Applicant: GSI Technology Inc., Sunnyvale, CA (US)

(72) Inventor: Avidan Akerib, Tel Aviv (IL)

(73) Assignee: GSI Technology Inc., Sunnyvale, CA (US)

( * ) Notice: Subject to any disclaimer, the term of this patent is extended or adjusted under 35 U.S.C. 154(b) by 620 days.

(21) Appl. No.: 15/784,152

(22) Filed: Oct. 15, 2017

(65) Prior Publication Data
US 2019/0114555 A1    Apr. 18, 2019

(51) Int. Cl.
| G06F 17/10 | (2006.01) |
| G06F 17/18 | (2006.01) |
| G06F 9/30 | (2018.01) |
| G06N 7/00 | (2006.01) |
| G06N 3/08 | (2006.01) |
| G06K 9/00 | (2006.01) |
| G06F 40/205 | (2020.01) |

(52) U.S. Cl.
CPC ............. *G06N 7/005* (2013.01); *G06F 17/10* (2013.01); *G06F 17/18* (2013.01); *G06F 40/205* (2020.01); *G06K 9/00* (2013.01); *G06N 3/08* (2013.01)

(58) Field of Classification Search
CPC ...... G06N 7/005; G06N 3/08; G06F 17/2705; G06F 17/10
USPC ......................................................... 707/776
See application file for complete search history.

(56) References Cited

U.S. PATENT DOCUMENTS

| 8,037,119 | B1 * | 10/2011 | Oberman | G06F 17/10 |
| | | | | 708/503 |
| 9,418,719 | B2 | 8/2016 | Akerib | |
| 9,558,812 | B2 | 1/2017 | Akerib | |
| 9,859,005 | B2 | 1/2018 | Akerib | |
| 2007/0061389 | A1 * | 3/2007 | Hussain | G06F 1/0307 |
| | | | | 708/277 |
| 2013/0054661 | A1 * | 2/2013 | Wegener | H03M 7/24 |
| | | | | 708/203 |
| 2013/0304786 | A1 * | 11/2013 | Moskovich | G06F 17/10 |
| | | | | 708/497 |
| 2014/0075162 | A1 * | 3/2014 | Azadet | H04L 1/0054 |
| | | | | 712/221 |

(Continued)

OTHER PUBLICATIONS

M. S. Razlighi, M. Imani, F. Koushanfar and T. Rosing, "LookNN: Neural network with no multiplication," Design, Automation & Test in Europe Conference & Exhibition (DATE), May 15, 2017, Lausanne, 2017, pp. 1775-1780. (Year: 2017).*

*Primary Examiner* — Hosain T Alam
*Assistant Examiner* — Robert F May
(74) *Attorney, Agent, or Firm* — Heidi Brun Associates Ltd.

(57) ABSTRACT

A method for an associative memory device includes dividing a multi-bit mantissa A of a number X to a plurality of smaller partial mantissas Aj, offline calculating a plurality of partial exponents F(Aj) for each possible value of each partial mantissa Aj and storing the plurality of partial exponents F(Aj) in a look up table (LUT) of the associative memory device. A system includes an associative memory array to store a plurality of partial mantissas Ai of a mantissa A of a number X and an exponent calculator to utilize the partial mantissas to compute e in the power of X.

13 Claims, 6 Drawing Sheets

(56) References Cited

U.S. PATENT DOCUMENTS

| | | | |
|---|---|---|---|
| 2015/0121043 A1* | 4/2015 | Lee | G06F 7/483 |
| | | | 712/222 |
| 2015/0131383 A1 | 5/2015 | Akerib | |
| 2016/0260013 A1* | 9/2016 | Ronnow | G06F 17/11 |
| 2017/0103320 A1* | 4/2017 | Henry | G06F 9/30189 |
| 2017/0322769 A1* | 11/2017 | Langhammer | G06F 5/16 |
| 2018/0018566 A1 | 1/2018 | Ehrman | |

* cited by examiner

| Input LUT (k) | F(A_1) $e^{(-1)^s*(2^{p1}*A1)*2^B}$ | F(A_2) $e^{(-1)^s*(2^{p2}*A2)*2^B}$ | ... | F(A_m) $e^{(-1)^s*(Am+1)*2^B}$ |
|---|---|---|---|---|
| 0 | $e^{(-1)^0*((2^{p1}*0)*2^B)}$ | $e^{(-1)^0*(2^{p2}\ 0\ 2^B)}$ | | $(e^{(-1)^0*(0+1)*2^B})$ |
| 1 | $e^{(-1)^0*((2^{p1}*1)*2^B)}$ | $e^{(-1)^0*(2^{p2}*1)*2^B}$ | | $(e^{(-1)^0*(1+1)*2^B})$ |
| 2 | $e^{(-1)^0*((2^{p1}*2)*2^B)}$ | $e^{(-1)^0*(2^{p2}*2)*2^B}$ | | $(e^{(-1)^0*(2+1)*2^B})$ |
| ... | | | | |
| $2^{py}$ | $e^{(-1)^1*((2^{p1}*2^y)*2^B)}$ | $e^{(-1)^1*(2^{p2}\ 2^y)*2^B}$ | | $(e^{(-1)^1*(2^y+1)*2^B})$ |

| Input LUT (k) | F(A_1) | F(A_2) |
|---|---|---|
| 0 | $e^{(-1)^0 ((32*0)2^0)}$ | $e^{(-1)^0 (0+1)2^0}$ |
| 1 | $e^{(-1)^0 ((32*0)2^1)}$ | $e^{(-1)^0 (0+1)2^1}$ |
| 2 | $e^{(-1)^0 ((32*0)2^2)}$ | $e^{(-1)^0 (0+1)2^2}$ |
| ... | | |
| 2047 | $e^{(-1)^1 ((32*31)2^{31})}$ | $e^{(-1)^1 (31+1)2^{31}}$ |

| Input LUT (k) | F(Y1) $e^{(256*Y1/2^B)}$ | F(Y2) $e^{(Y2/2^B)}$ |
|---|---|---|
| 0 | 1 | 1 |
| 1 | $e^{(1*256/2^B)}$ | $e^{(1/2^B)}$ |
| 2 | $e^{(2*256/2^B)}$ | $e^{(2/2^B)}$ |
| 3 | $e^{(3*256/2^B)}$ | $e^{(3/2^B)}$ |
| ... | | |
| 255 | $e^{(255*256/2^B)}$ | $e^{(256/2^B)}$ |

FIG. 7

PRECISE EXPONENT AND EXACT SOFTMAX COMPUTATION

FIELD OF THE INVENTION

The present invention relates to associative computation generally and to data mining algorithms using associative computation in particular.

BACKGROUND OF THE INVENTION

Data mining is a computational process of discovering patterns in large datasets. It uses different techniques to analyze large datasets, one of which is classification. Classification is used to predict group membership for data instances based on data items stored in the dataset, whose group membership is known. The softmax regression is one of the known data mining classification methods used in various multiclass classification methods, such as multinomial logistic regression, multiclass linear discriminant analysis, naive Bayes classifiers, artificial neural networks, and other deep learning algorithms applied to fields including computer vision, speech recognition, natural language processing, audio recognition, social network filtering, machine translation, bioinformatics and others.

The softmax regression "squashes" an N-dimensional vector of arbitrary real values to an N-dimensional vector of real values in the range [0, 1] that add up to 1 and is defined in equation 1:

$$Si = \frac{e^{xi}}{\sum_{j=1}^{N} e^{xj}} \qquad \text{Equation 1}$$

Where N is the size of the dataset and $x_i$ and $x_j$ are floating point numbers representing the original values stored in the dataset in locations i and j respectively.

In classification algorithms, the softmax regression calculates the probability of an object to belong to each of the N defined classes.

A binary floating-point (FP) number x may be represented in memory using equation 2:

$$x = (-1)^{S} * (A+1) * 2^{B} \qquad \text{Equation 2}$$

Where S is the sign of the number (negative/positive) represented by a single bit, A is the mantissa and B is the exponent. The value 1 for the sign bit S indicates a negative number, and the value 0 indicates a positive number.

Using the formula of equation 2 to represent x, $e^x$ of equation 1 may be expressed by equation 3:

$$e^x = e^{(-1)^{S} * (A+1) * 2^{B}} \qquad \text{Equation 3}$$

The calculation of $e^x$ may be done using the standard Taylor Series defined in equation 4:

$$e^x = 1 + x + \frac{x^2}{2} + \frac{x^3}{3!} + \cdots \qquad \text{Equation 4}$$

The Taylor Series may also be expressed as:

$$e^x = y1 + y2 + y3 + \cdots \qquad \text{Equation 5}$$

Where $y1 = 1$, $y2 = 1 * \frac{x}{1}$, $y3 = y2 * \frac{x}{2}$, $y4 = y3 * \frac{x}{3}$, etc.

It may be appreciated that the Taylor Series computation is performed using multiple multiplication and division operations. For high accuracy in this computation, many coefficients and multiplication operations that may slowdown the process significantly may be required. The larger x is, the more coefficients may be needed and the heavier the computation may become.

It may be appreciated that the Taylor Series for the computation of ex may be done in parallel on existing devices. Current associative memory devices, such as the ones described in U.S. patent application Ser. No. 14/588,419, U.S. patent application Ser. No. 14/555,638 and U.S. patent Ser. No. 15/146,908, all assigned to the common assignee of the present application, may provide superior performance and response time by concurrently computing the Taylor Series for all items in the dataset.

Nevertheless, using the softmax regression on a large dataset (N>150,000) is difficult to implement, even on the associative memory devices mentioned above, because the softmax regression is not linear and the final result may be achieved only after the value $e^{xj}$ of each object j in the dataset is calculated in order to calculate the sum $\Sigma_{j=1}^{N} e^{xj}$. It also requires a large memory unit to store all the intermediate results of the calculations of $e^{xj}$ for each object j in the dataset. Moreover, the dynamic range of the computation, and the accumulation of millions of numbers may have an impact on the accuracy of the calculation, especially when xj is large and may result in an overflow ($e^{xi}$ may be out of range when xi is large). In addition, the computation of a softmax regression using current devices may not provide micro-millisecond speed range and low latency, as required by deep learning algorithms.

SUMMARY OF THE PRESENT INVENTION

There is provided, in accordance with an embodiment of the present invention, a method for an associative memory device. The method includes dividing a multi-bit mantissa A of a number X to a plurality of smaller partial mantissas A_j, offline calculating a plurality of partial exponents F(A_j) for each possible value of each partial mantissa A_j and storing the plurality of partial exponents F(A_j) in a look up table (LUT) of the associative memory device.

Moreover, in accordance with an embodiment of the present invention, the offline calculating includes using a high number of Taylor series coefficients.

Furthermore, in accordance with an embodiment of the present invention, the method further includes comparing each possible value k of partial mantissa A_j, one value at a time, to a plurality of partial mantissas Ai_j, each stored in a column i of a section sec-A_j of the associative memory device and marking each column i of each section sec-A_j storing the value k.

Still further, in accordance with an embodiment of the present invention, the method further includes reading the partial exponents F(A_j) from row k of the LUT and concurrently writing each read partial exponents F(A_j) to all marked columns of each associated section sec-F_j.

Additionally, in accordance with an embodiment of the present invention, the method further includes concurrently on each column i, multiplying partial exponents stored in each sec-F_j and storing a result of the multiplication in columns i of section sec-$e^x$, the result being the value of e in the power of X.

Additionally, in accordance with an embodiment of the present invention, the method further includes utilizing the values stored in said section sec-$e^x$ to calculate any of softmax, softplus, sigmoid or tanh.

Moreover, in accordance with an embodiment of the present invention, the method further includes concurrently on each row of sec-$e^x$ count a number of bits having a predefined value and store a result of said counting in a vector SUM.

Additionally, in accordance with an embodiment of the present invention, the predefined value is one.

Moreover, in accordance with an embodiment of the present invention, the method further includes normalizing values stored in sec-$e^x$ and storing said normalized values in a sec-S.

Furthermore, in accordance with an embodiment of the present invention, the normalizing includes concurrently dividing each column i of said sec-$e^x$ by a value stored in SUM, thereby providing a result of a softmax regression in sec-S.

There is provided, in accordance with an embodiment of the present invention, a system. The system includes an associative memory array to store a plurality of partial mantissas A_j of a mantissa A of a number X and an exponent calculator to utilize the partial mantissas to compute e in the power of X.

Furthermore, in accordance with an embodiment of the present invention, the associative memory array includes a plurality of partial mantissa sections to store in each column i of a section sec-A_j a partial mantissa Ai_j, a plurality of partial exponent sections to store in each column i of section sec-j a value of a partial exponent F(A_j) and a section sec-$e^x$ to store in each column i a value computed by multiplying values of the partial exponents stored in column i of the partial exponent sections, thereby providing e in the power of X.

Additionally, in accordance with an embodiment of the present invention, the exponent calculator also includes a look up table (LUT) to store pre-calculated values of partial exponents of e using all possible values of a partial mantissa, a partial exponent assigner to concurrently compare values stored in each column i in sec-A_j to a value k, to mark all columns storing value k and to concurrently write to each marked column i in a partial exponent section sec-j a value read from the LUT, and an exponent multiplier to multiply values stored in each column i of the partial exponent sections and store a result of the multiplication is section sec-$e^x$.

Moreover, in accordance with an embodiment of the present invention, the associative memory array also includes a vector SUM to store a sum of all values stored in columns of sec-$e^x$, and a section sec-S to store in each column i a value of a softmax regression Si computed by dividing a value stored in a column i of sec-$e^x$ by the sum.

Furthermore, in accordance with an embodiment of the present invention, the system also includes an exponent adder to sum all values of exponents stored in all columns i of sec-$e^x$, and a normalizer to concurrently divide each value stored in each column i of sec-$e^x$ by the sum and store a result of the division in columns i of section sec-S thereby providing a value of an exact softmax in sec-S.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicant has realized that highly accurate results of the softmax regression for the entire dataset, referred herein as "exact softmax", may be implemented with a complexity of O(1) on associative memory devices such as those described in U.S. patent application Ser. No. 14/588,419, U.S. patent application Ser. No. 14/555,638 and U.S. patent application Ser. No. 15/146,908, all assigned to the common assignee of the present invention.

Figure 1:
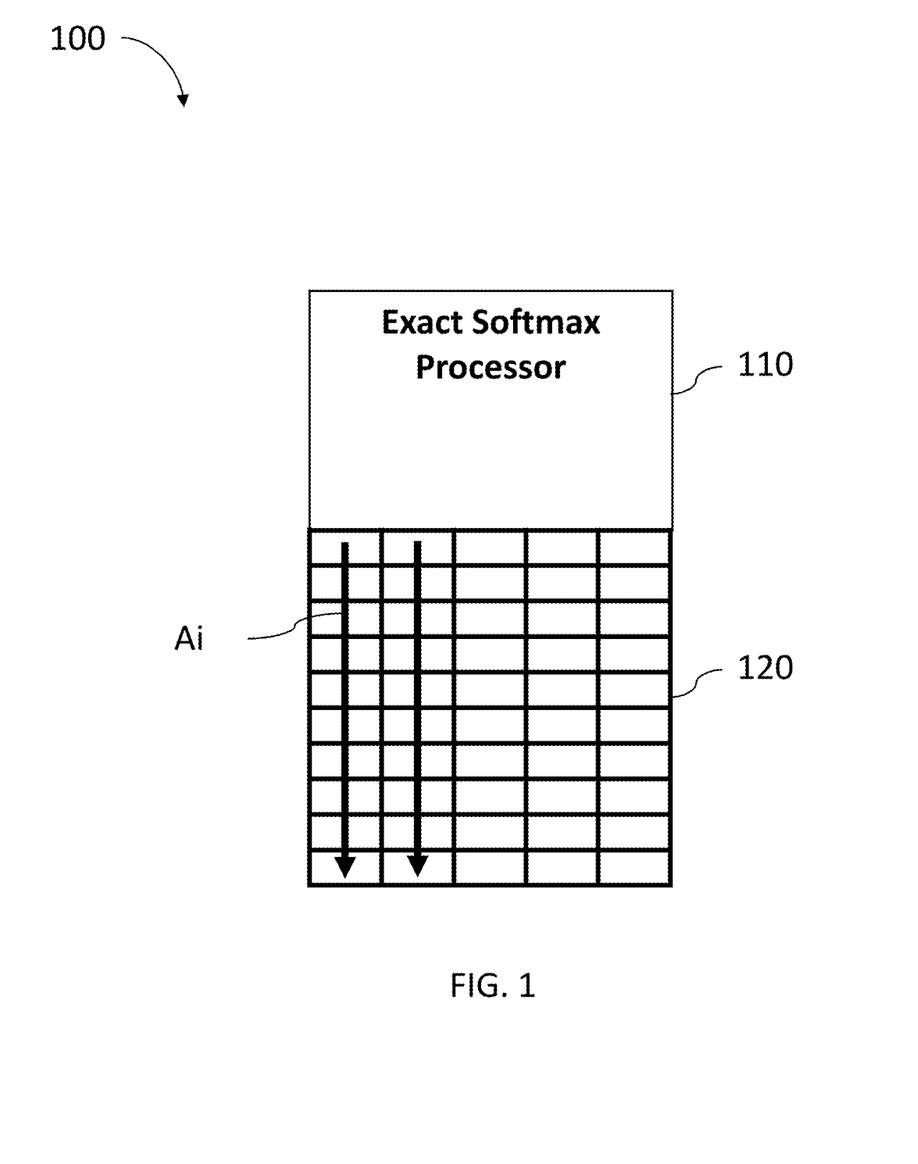
FIG. 1 is a schematic illustration of an exact softmax system, constructed and operative in accordance with an embodiment of the present invention.

FIG. 1, to which reference is now made, schematically illustrates an exact softmax system 100, constructed and operative in accordance with a preferred embodiment of the present invention. Exact softmax system 100 comprises an exact softmax processor 110 that may concurrently calculate a highly accurate value of a softmax regression on a large dataset of numbers and an associative memory array 120 that may store mantissa Ai of each value Xi from the large dataset, on which a softmax regression is to be performed.

Associative memory array 120 comprises a plurality of sections, each section comprised of a plurality of rows and column. Mantissa Ai may be stored in column i of associative memory array 120.

Applicant has realized that mantissa A of each floating point (FP) value X (Equation 2) for which the exact softmax regression is to be calculated may be represented as a sum of m variables $A\_j$, where each variable is a partial mantissa composed of several bits out of the total bits of mantissa A. It may be appreciated that the notation $A\_j$ represents the partial mantissa j of mantissa A.

The value of each partial mantissa $A\_j$ is the value of the bits of $A\_j$ multiplied by the relevant power of two (p1, p2 . . . ) determined by the location of partial mantissa $A\_j$ within the whole mantissa A as defined in equation 6.

$$A=2^{p1}*A\_1+2^{p2}*A\_2+\ldots A\_m \quad \text{Equation 6}$$

It may be appreciated that, in the present specification, the power of two is sometimes written as $2^p$ and sometimes as $2\textasciicircum p$.

For a general 10-bit mantissa A, one possible representation may be 2 variables, $A\_1$ and $A\_2$, of 5-bits each. When $A\_1$ includes the 5 MSB bits of A and $A\_2$ includes the 5 LSB bits of A, the value of A may be expressed by equation 7:

$$A=32*A\_1+A\_2 \quad \text{Equation 7}$$

Another example of a possible representation of the 10-bit mantissa A may be with 4 variables $A\_1, A\_2, A\_3$ and A4. $A\_1$ includes the 3 MSB bits of A, $A\_2$ includes the next 3 MSB bits, $A\_3$ includes the next 3 bits and A4 includes the LSB bit and the sign bit as defined in equation 8:

$$A=128*A\_1+16*A\_2+4*A\_3+A4 \quad \text{Equation 8}$$

Applicant has realized that representing a mantissa A as a sum of partial mantissas $A\_j$ may be advantageous when working with associative memory array 120. Each specific partial mantissa j of mantissa Ai—marked as partial mantissa $Ai\_j$ (of each floating-point value Xi) may be stored in a same column i of a separate section sec-j of associative memory array 120 as illustrated in FIG. 2 to which reference is now made.

Figure 2:
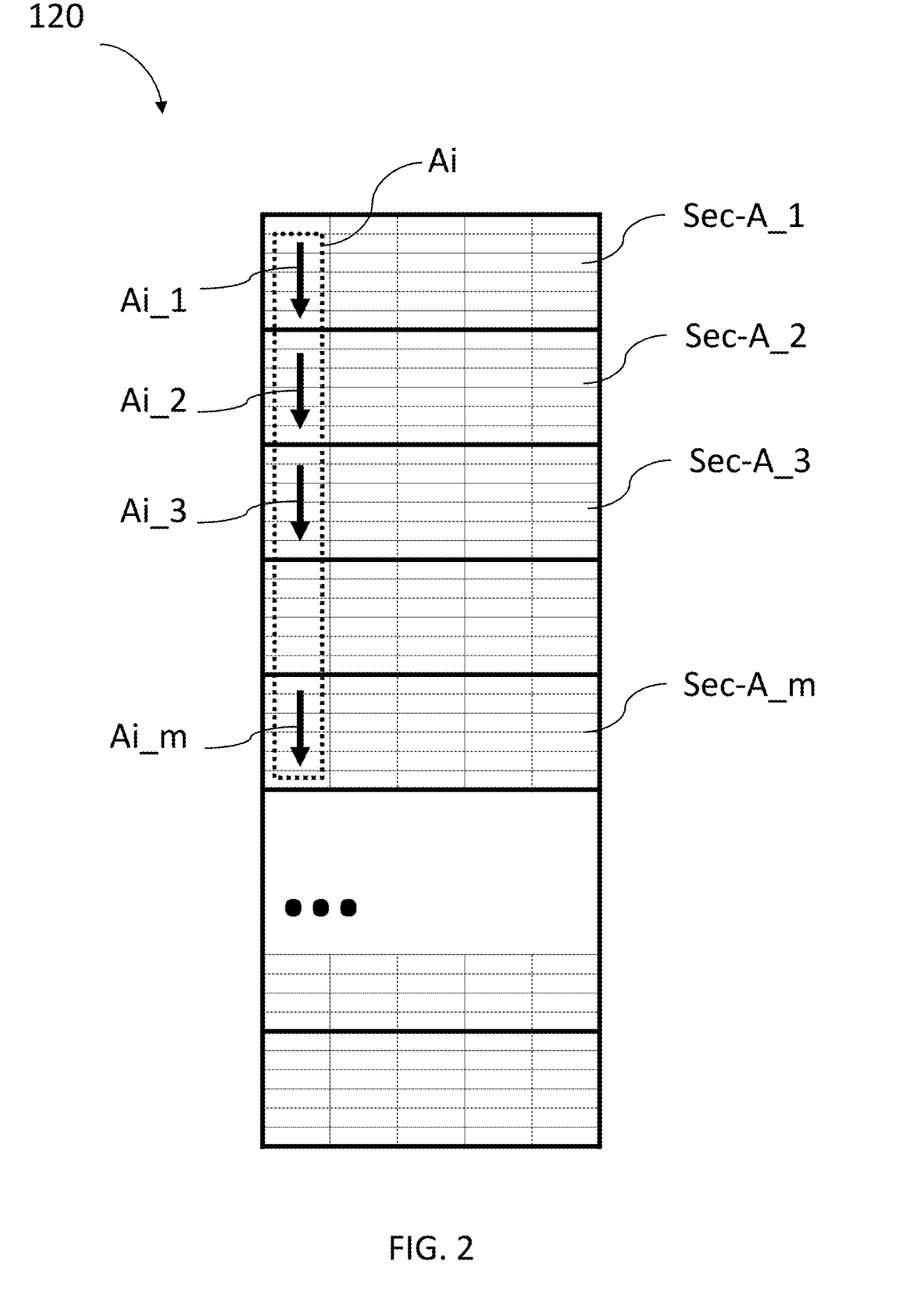
FIG. 2 is a schematic illustration of a part of the associative memory array element of an exact softmax system of FIG. 1 according to an embodiment of the present invention.

FIG. 2 is a schematic illustration of a part of associative memory array 120, divided into sections sec-A_1, sec-A_2, sec-A_3 . . . sec-A_m, each storing different bits of each mantissa Ai. Section sec-A_1 may store in column i the bits of partial mantissa $Ai\_1$ of each FP number Xi; section sec-A_2 may store the bits of partial mantissa $Ai\_2$ in column i, and section sec-A_m may store in a column i the bits of partial mantissa $Ai\_m$. Other sections of associative memory array 120, not specifically illustrated in FIG. 2, may be used by softmax processor 110 to store intermediate and final results of the softmax regression computation as described in detail hereinbelow. It may be appreciated that exact softmax processor 110 may concurrently operate on multiple sections and may perform different operations on different sections of associative memory array 120. It may also be appreciated that a computation is done concurrently on all columns of a section.

Using the representation of the mantissa A as a sum of m partial mantissas $A\_j$ (Equation 6), $e^x$ may be represented by equation 9:

$$e^x=e^{(-1)^{S}*(2^{p1}*A\_1+2^{p2}*A\_2+\ldots+A\_m+1)*2^B} \quad \text{Equation 9}$$

Where p1, p2 . . . represent the power by which 2 should be raised, and is defined according the location of the bits in the original mantissa A. For example, the value of p of a partial mantissa that spans bits in locations 5-10 is 5. Using the standard mathematical exponent product rules $(x^{a+b}=x^a*x^b)$, $e^x$ may be expressed as a multiplication of m partial exponents of e, where each partial mantissa $A\_j$ of each such exponent includes only several consecutive bits of the original mantissa A as defined in equation 10:

$$e^x=e^{(-1)^{S}*(2^{p1}*A\_1)*2^B}*e^{(-1)^{S}*(2^{p2}*A\_2)*2^B}*\ldots*e^{(-1)^{S}*(A\_m+1)*2^B} \quad \text{Equation 10}$$

For simplicity, each partial exponent of e computed with partial mantissa $A\_j$ may be expressed as $F(A\_j)$:

$$e^{(-1)^{S}*(2^{p1}*A\_1)*2^B}=F(A\_1)$$

$$e^{(-1)^{S}*(2^{p2}*A\_2)*2^B}=F(A\_2)$$

...

$$e^{(-1)^{S}*(A\_m+1)*2^B}=F(A\_m)$$

This produces a simplified representation, as shown in equation 11.

$$e^x=F(A\_1)*F(A\_2)*\ldots*F(A\_m) \quad \text{Equation 11}$$

It may be appreciated that once the values of the partial exponents $F(A\_1), F(A\_2), \ldots, F(A\_m)$, are known, additional multiplications may be required, $F(A\_1)*F(A\_2)*\ldots*F(A\_m)$, to complete the computation of the original exponent $e^x$.

Figure 3:
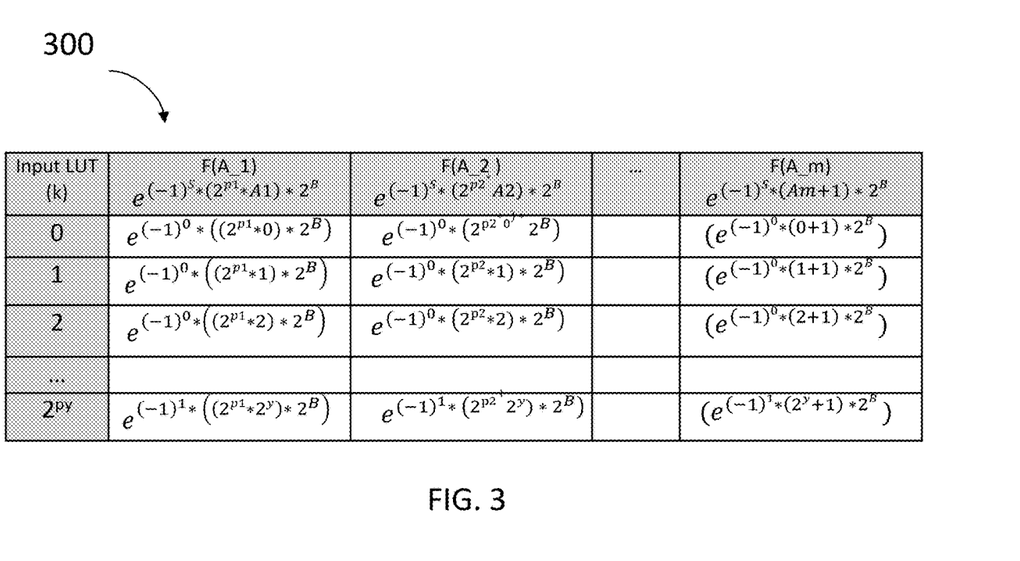
FIG. 3 is a schematic illustration of a look up table (LUT) storing partial exponents used by exact softmax system of FIG. 1 according to an embodiment of the present invention.

Applicant has realized that the values of the partial exponents $F(A\_1), F(A\_2), \ldots, F(A\_m)$ don't change and thus, may be calculated in advance and stored in a look up table (LUT) 300, illustrated in FIG. 3 to which reference is now made.

LUT 300 comprises $2^{py}$ entries, one for each possible value of partial mantissa $A\_j$, where py is a function of the number of bits in the largest $A\_j$, the number of bits in exponent B, as defined in equation 12:

$$py=1+\text{number of bits in the largest } A\_j+\text{number of bits in } B \quad \text{Equation 12}$$

Each entry in LUT 300 may store the result of the computation of each partial exponent $F(A\_j)$ with each valid value of partial mantissa $A\_j$. In line 0 of LUT 300, the values of each $F(A\_j)$ may be computed assuming the value of partial mantissa $A\_j$ is 0. In line 1 of LUT 300, the values of each $F(A\_j)$ may be computed assuming the value of partial mantissa $A\_j$ is 1 and so on until the last line of LUT 300 in which the values of each $F(A\_j)$ may be computed assuming the value of partial mantissa $A\_j$ is $2^{py}$.

It may be appreciated that the values stored in LUT 300 may be calculated in advance with great accuracy and with as many coefficients as needed. This calculation may be performed only once prior to the actual calculation of the exact softmax.

Figure 4:
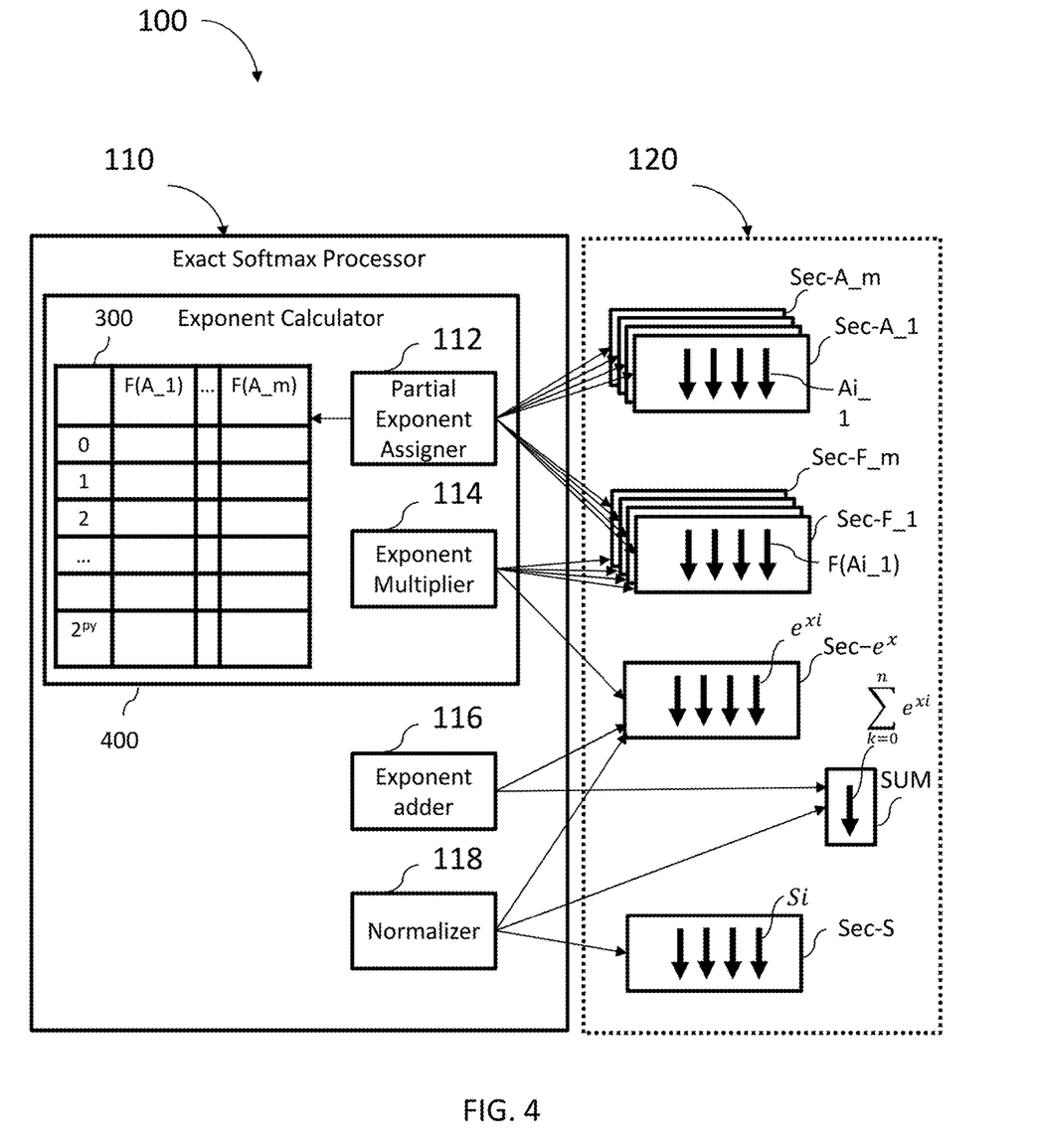
FIG. 4 is a detailed schematic illustration of an exact softmax system that includes an exponent calculator constructed and operative in accordance with an embodiment of the present invention.

FIG. 4 to which reference is now made, schematically illustrates, in more detail, exact softmax system 100 of FIG. 1, constructed and operative in accordance with a preferred embodiment of the present invention. Exact softmax processor 110 comprises exponent calculator 400, an exponent adder 116 and a normalizer 118.

In addition, different sections of associative memory array 120 on which exact softmax processor 110 may operate are also schematically illustrated. Associative memory array 120 comprises sections sec-A_j to store in each column i the value of partial mantissas $Ai\_j$, sections sec-F_j to store partial exponents F(Ai_j), a section sec-$e^x$ to store in each column i the value of $e^{xi}$, a vector SUM to store the sum of all the exponents needed to calculate the softmax regression, and a section sec-S to store in each column i the calculated softmax regressions Si of each Xi.

Exponent calculator 400 comprises a LUT 300 (of FIG. 3), a partial exponent assigner 112, an exponent multiplier 114. Partial exponent assigner 112 may loop on all possible value k of the partial mantissas of LUT 300. For each k, partial exponent assigner 112 may, concurrently on all sections sec-A_j, compare in parallel the value of all partial mantissas Ai_j stored in each column i and mark all columns in each section having a same value as k.

In parallel, partial exponent assigner 112 may read the value of partial exponents F(A_j) of row k of LUT 300 and may concurrently, write each value F(A_j) to all previously marked columns i, in each associated section sec-F_j. The operation of partial exponent assigner 112 may take $2^{py}$ steps, each step operating on a different value of k.

Exponent multiplier 114 may concurrently multiply all partial exponents F(Ai_j) stored in each column i of each sections F_j to calculate $e^x$ using equation 11. It will be appreciated that exponent multiplier 114 may perform the multiplications concurrently on all columns of all sections and may store each $e^{xi}$ in column i of section sec-$e^x$. This operation may take one step for each multiplication.

Exponent adder 116 may calculate the sum of all $e^{xi}$. Each value of $e^{xi}$ may be converted to a fixed-point number of L bits and may be stored back to columns of section sec-$e^x$. It may be appreciated that each fixed-point number may be stored in L rows of section sec-$e^x$. L may be 32, 64 or any other number that will not affect the accuracy of the computation. Exponent adder 116 may iterate over the rows of section sec-$e^x$, starting from the LSB to the MSB and count all bits having the value 1 in each row. Exponent adder 116 may then store the results of the count of each row in dedicated vector SUM in associative memory array 120.

One possible embodiment of a count operation is described in, U.S. patent application Ser. No. 15/648,475 filed Jul. 13, 2017 entitled "FINDING K EXTREME VALUES IN CONSTANT PROCESSING TIME" and assigned to the common assignee of the present invention. Computing the sum of all $e^{xi}$ may take L*count operation steps.

Once the sum is calculated and stored in vector SUM in associative memory array 120, normalizer 118 may concurrently calculate the final result Si of the softmax regression in each column i by dividing the value of each $e^{xi}$ stored in columns i in section sec-$e^x$ with the value stored in SUM. The computation of all values of Si may take one step of about a few hundred clocks.

Figure 5:
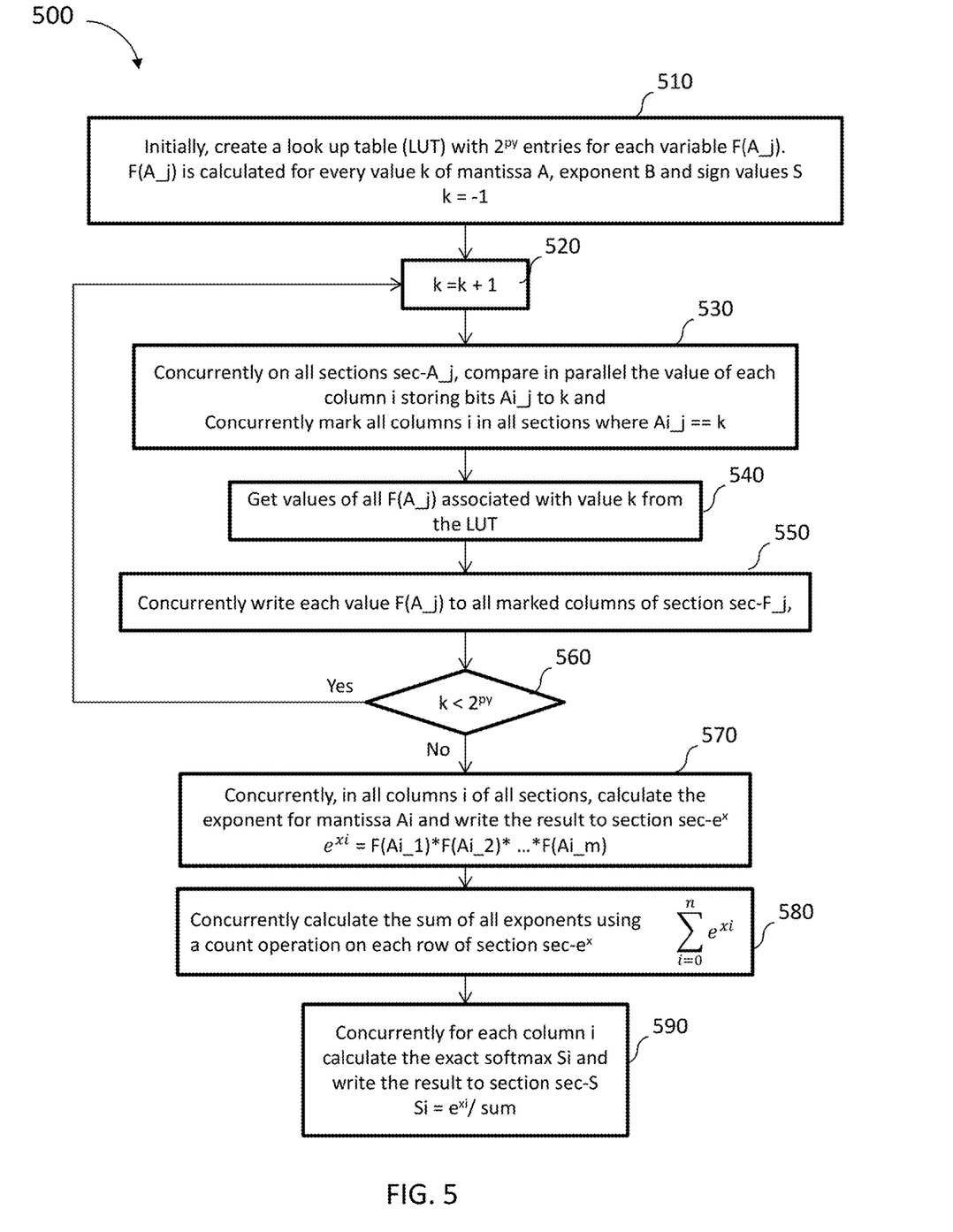
FIG. 5 is a flow chart describing an exemplary flow of operations of an exact softmax system according to an embodiment of the present invention.

FIG. 5, to which reference is now made, is a flow chart 500 describing the operation of exact softmax system 100, constructed and operative in accordance with a preferred embodiment of the present invention. In step 510, which is an initiating step, LUT 300 may be created with all values of partial exponents F(A_j). In step 520, partial exponent assigner 112 may initialize the input value k used to pass over LUT 300. In step 530, partial exponent assigner 112 may concurrently compare the value of each partial mantissa Ai_j to the value of k and may mark all columns in all sections storing partial mantissas whose values are identical to k (Ai_j==k).

In step 540, partial exponent assigner 112 may get the values of F(A_j) from the relevant entry (row k) of LUT 300 and in step 550 partial exponent assigner 112 may concurrently write the value of each F(A_j) to all marked columns in each relevant sect-F_j. For example, the value F(A_2) (calculated for partial mantissa A_2 with the value k) may be written to all columns of section sect-F_2 for which the value of the partial mantissa stored in section A_2 is equal to k.

In step 560 partial exponent assigner 112 may check its location in LUT 300. Steps 520-560 may be repeated until the entire table has been scanned. After the entire LUT 300 have been scanned, in step 570 exponent multiplier 114 may concurrently calculate all exponents $e^{xi}$ by multiplying all partial exponents and in step 580 exponent adder 116 may compute and store the sum of all exponents $e^{xi}$. In step 590, normalizer 118 may concurrently compute the exact softmax Si for each column i of section sec-$e^x$, by dividing the value of each $e^{xi}$ stored in each column i of sec-$e^x$, by the sum stored in SUM and store the exact softmax values Si in section sec-S for further usage.

It may be appreciated by the skilled person that the steps shown in flow 500 are not intended to be limiting and that the flow may be practiced with more or less steps, or with a different sequence of steps, or any combination thereof.

It may be appreciated that exponent calculator 400 may be utilized in any computation involving the calculation of $e^x$, including numerous activation functions in a neural network such as softmax, described herein, and other functions such as a sigmoid function.

$$\frac{1}{1+e^{-x}},$$

a tanh function $$\frac{e^x - e^{-x}}{e^x + e^{-x}},$$

a softplus function $\ln(1+e^x)$ the inverse of the softplus function $\ln(e^x-1)$ and the like.

A concrete example may be a 10-bit mantissa. Using equation 2, a 16 bit half precision floating point (FP) number x may be represented in memory as $x=(-1)^{S}*(A+1)*2^B$ where S is the sign bit, A is a 10-bit mantissa and B is a 5-bit exponent. The exponent of e may be expressed as $e^x = e^{(-1)^{S}*(A+1)*2^B}$. The 10 bit mantissa A may be represented as a sum of two 5-bit variables A=32*A_1+A_2, where A_1 is the 5 MSB bits and A_2 is the 5 LSB bits; therefore, x may also be represented as $x=(-1)^{S}*(A+1)*2^B=(-1)^{S}*(32*A\_1+A\_2+1)*2^B$, and the exponent of e may be represented as $e^x=e^{(-1)^{S}*(32*A\_1+A\_2+1)*2^B}$.

Applying the mathematical exponent rules with partial mantissas of 5-bit each may give $e^x=e^{(-1)^{S}*(32*A\_1)*2^B}*e^{(-1)^{S}*(A\_2+1)*2^B}$. Simplifying the equation may result in the equation $ex=F(A\_1)*F(A\_2)$, where $F(A\_1)=e^{(-1)^{S}*(32*A\_1)*2^B}$ and $F(A\_2)=e^{(-1)^{S}*(A\_2+1)*2^B}$. In this case, which has only two variables, only one additional multiplication is required, $F(A\_1)*F(A\_2)$, to complete the computation of $e^x$.

Figure 6:
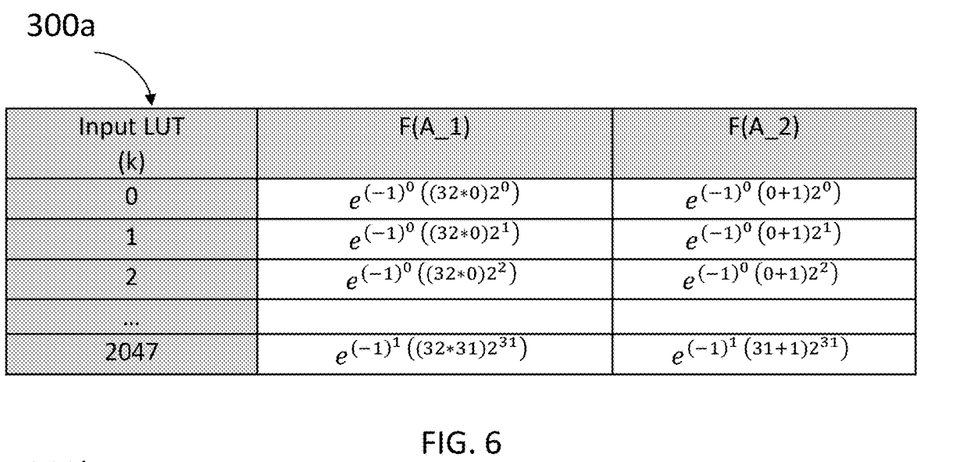
FIG. 6 is a schematic illustration of an exemplary LUT for partial exponents calculated using 5-bit partial mantissas of floating-point numbers according to an embodiment of the present invention.

It may be appreciated that the look up table of this example contains 2048 entries (there are 5 bits of each partial mantissa (A_1 or A_2), 5 bits of the exponent B and 1 bit for the sign S which provides 11 bits and produces $2^{11}$=2048 possible values). FIG. 6 illustrates LUT 300a applicable for this example.

In this example, most of the computation entails searching for the values of k from 0 to 2047 and writing the associated values from LUT 300a to sections sec-F_1 and sec-F_2 in associative memory array 120. This may take a total of 2048 clocks, one clock per value of k. One additional multiplication for F(A_1)*F(A_2), which takes a few hundred clocks is required.

It will be appreciated that, when using fixed point exponents, rather than floating point exponents, the 16-bit FP number Xi may be expressed as $X=Y/2^B=(256*Y1+Y2)/2^B$ where Y1 represents the 8 MSB bits, Y2 represents the 8 LSB bits and B may have a fixed value between 0 to 16.

For simplicity, the sign bit is ignored in this example since it has no impact on the overall performance of the computation. The exponent of e in this case may be expressed as $e^x=e^{((256*Y1+Y2)/2^B)}$ and using the standard mathematical exponent product rules, the exponent may be expressed as $e^x=e^{(256*Y1/2^B)}*e^{(Y2)/2^B)}$. The values of Y1 and Y2 (each having 8 bit mantissas) may be calculated in advance and stored in LUT 300b (shown in FIG. 7). In this example, the number of entries in LUT 300b is the number of possible values of the 8-bit variables Y1 and Y2 which is $2^8=256$.

Figure 7:
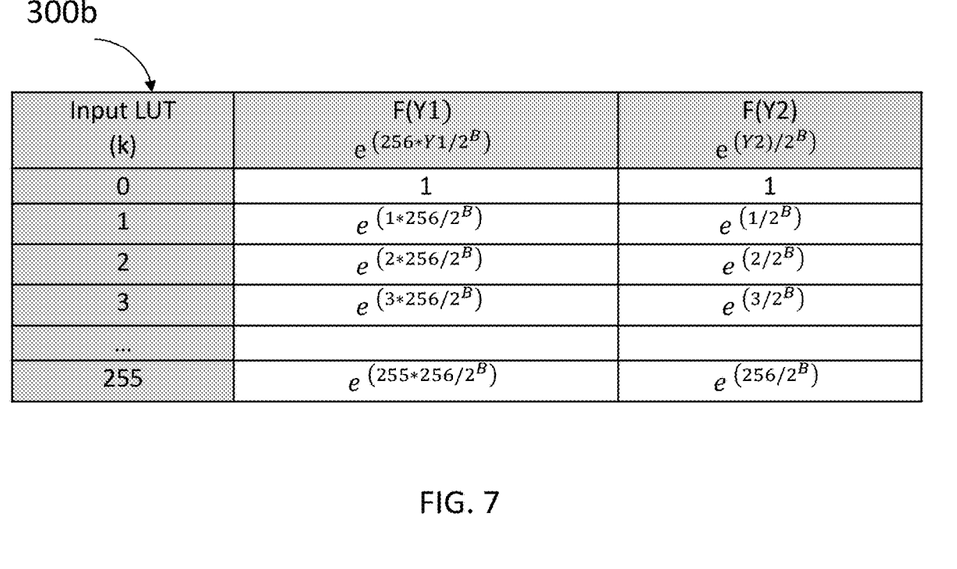
FIG. 7 is a schematic illustration of an exemplary LUT for partial exponents calculated using 8-bit partial mantissas of fixed-point numbers according to an embodiment of the present invention.

Each entry in LUT 300b may store a value of the partial exponents of Y1 and Y2 out of the 256 possible values. It may be appreciated that the entire computation in this case, including a search operation for each input value, from 0 to 256, and a write operation of the appropriate values into sections sec-F_1 and sec-F_2 in associative memory array 120, may take 256 clocks. One fixed point additional multiplication may take around a few hundred additional clocks, providing a total computation time of less than 0.3 micro seconds for the entire dataset.

It may be appreciated that the total computation of softmax for all items in a large dataset may take less than 2 micro seconds (about 2500 clocks for FP numbers and about 1500 clocks for fixed point numbers).

It may be appreciated that the performance of a softmax computation takes about 8 milliseconds on a prior art GPGPU (General Purpose computation using Graphic Processing Unit), which is 4000 times slower than the performance of the current invention.

It may be appreciated that the offline computation of each partial exponent F(A_j) may be done in several ways. One way may be to calculate the partial exponents using the Taylor Series of equation 4. However, since the partial mantissa is smaller than the full mantissa, for example, only 5-bit in the partial mantissa compared to the 10-bit in the full mantissa, the computation may be much faster.

It will be appreciated that, by calculating each partial exponent F(A_j) offline, the present invention may calculate the F(A_j) with as many coefficients of the Taylor Series as desired. The result may be accurate values for all of the partial exponent F(A_j).

It may also be appreciated that a further improvement of the performance may be achieved by adding further parallelization of the process. Such parallelism may be achieved if associative memory array 120 is large enough to store multiple copies of the dataset. As defined before, the LUT is traversed one entry at a time until all entries have been scanned. For a LUT of 2048 entries, the computation time of partial exponent assigner 112 may be 2048 clocks. However, it may be possible to duplicate the dataset to additional sections of associative memory array 120. In this case, partial exponent assigner 112 may split the LUT and use only half of the LUT with each copy of the dataset. Thus, partial exponent assigner 112 may work twice as fast, and may complete its computation in only 1024 clocks. If the data can be copied Y times, the computation of partial exponent assigner 112 may be Y times smaller.

When x is large, ex may become very large and may create an overflow. To avoid this case, it may be useful to reduce the size of the exponent. Using standard arithmetic, it is possible to multiply both the numerator and the denominator of a division by any chosen value C. Applying this rule to the softmax regression may be described in equation 13:

$$Si = \frac{Ce^{xi}}{C \sum_{j=1}^{N} e^{xj}} \qquad \text{Equation 13}$$

Using the standard mathematical exponent rules, the outcome may be equation 14

$$Si = \frac{e^{xi+ln(c)}}{\sum_{j=1}^{N} e^{xj+ln(c)}} \qquad \text{Equation 14}$$

C may be defined as the largest value of $e^{xi}$ stored in a section $e^x$, $c=(-1) \max(e^{xj})$ for all j=1, N, resulting in smaller exponent values. A method for finding a maximum value in a large dataset with a complexity O(1) is defined in U.S. patent application Ser. No. 15/688,895, filed Aug. 29, 2017 entitled "METHOD FOR MIN-MAX COMPUTATION IN ASSOCIATIVE MEMORY" and U.S. patent application Ser. No. 14/594,434 filed Jan. 12, 2015 entitled "MEMORY DEVICE" publication number 2015/0200009 with complexity of O(1).

It may be appreciated that using the current invention may provide an exact softmax regression with the highest accuracy for large datasets, with computation complexity of O(1). In addition, the average time for computing the softmax regression in exact softmax system 100 of the current invention may take less than 8 micro seconds which is a few orders of magnitude faster than can be achieved in a GPU (Graphics Processing Unit).

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for an associative memory device, the method comprising:
    dividing a variable length mantissa A of a floating point number x into a plurality of smaller fixed length partial mantissas A_j, said fixed length defined according to a length of a look-up table (LUT);
    offline calculating a plurality of partial exponents F(A_j) for each possible value of each said partial mantissa A_j;
    storing said plurality of partial exponents F(A_j) in said LUT of said associative memory device;
    using said associative memory device, selecting those of said partial exponents F(A_j) from said LUT which are associated with said fixed length partial mantissas A_j of said variable length mantissa A; and
    using said associative memory device, determining $e^x$ from said selected partial exponents F(A_j).

2. The method of claim 1 and wherein said selecting comprises comparing each possible partial mantissa A_j, one value at a time, to a plurality of partial mantissas Ai_j, each stored in a column i of a section sec-A_j of said associative memory device and marking each column i of each section sec-A_j storing said partial mantissa A_j.

3. The method of claim 2 and wherein said selecting comprises reading said partial exponents F(A_j) associated with said partial mantissa A_j from said LUT and concurrently writing each said read partial exponents F(A_j) to all said marked columns of each associated section sec-F_j.

4. The method of claim 3 and wherein said determining comprises concurrently on each column i:
multiplying partial exponents stored in each sec-F_j; and
storing a result of said multiplication in columns i of section sec-$e^x$, said result being the value of $e^x$.

5. The method of claim 4 further comprising utilizing said values stored in said section sec-$e^x$ to calculate one of: softmax, softplus, sigmoid and tanh.

6. The method of claim 4 concurrently on each row of sec-$e^x$:
counting a number of bits having a predefined value; and
storing a result of said counting in a vector SUM.

7. The method of claim 6 wherein said predefined value is one.

8. The method of claim 6 further comprising normalizing values stored in sec-$e^x$ and storing said normalized values in a sec-S.

9. The method of claim 8 wherein said normalizing comprises concurrently dividing each column i of said sec-$e^x$ by a value stored in said vector SUM, thereby providing a result of a softmax regression in said sec-S.

10. An associative memory device comprising:
a storage area; and
a processing unit,
said storage area comprising:
a LUT to store a plurality of partial exponents F(A_j) for each possible value of fixed length partial mantissas A said partial exponents previously generated by an exponent calculator;
a plurality of columns divided into fixed length partial mantissa sections, each column i to store a variable length mantissa Ai of a floating point number xi divided into fixed length partial mantissas Ai said length defined according to a length of said LUT;
said processing unit comprising:
a partial exponent assigner to store those of said partial exponents F(A_j) from said LUT which are associated with said fixed length partial mantissas A_J; and
an exponent multiplier to determine $e^{xi}$ for each said floating point number xi from said selected partial exponents F(Ai_j) for said column i.

11. The device of claim 10 wherein said storage area comprises:
a plurality of associated columns divided into partial exponent sections, each section sec-j of column i to store a value of a partial exponent F(A_j) associated with said partial mantissa Ai_j; and
a section sec-$e^x$ to store in each column i a value computed by multiplying values of said partial exponents stored in said column i of said partial exponent sections, thereby providing a value of said $e^{xi}$.

12. The device of claim 11 and also comprising:
a vector SUM to store a sum of all said values stored in columns of said sec-$e^{xi}$; and
a section sec-S to store in each column i a value of a softmax regression Si computed by dividing a value stored in a column i of said sec-$e^x$ by said sum.

13. The device of claim 12 also comprising:
an exponent adder to sum all values of exponents stored in all columns i of said sec-$e^x$; and
a normalizer to concurrently divide each value stored in each column i of said sec-$e^x$ by said sum and store a result of said division in columns i of said section sec-S thereby providing a value of an exact softmax in sec-S.

\* \* \* \* \*